US012803664B2

(12) United States Patent
Nishioka et al.

(10) Patent No.: US 12,803,664 B2
(45) Date of Patent: Nov. 17, 2026

(54) IFoF SCHEME OPTICAL TRANSMISSION SYSTEM

(71) Applicant: Mitsubishi Electric Corporation, Tokyo (JP)

(72) Inventors: Junya Nishioka, Tokyo (JP); Takatoshi Akamatsu, Tokyo (JP); Yoshiaki Konishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 175 days.

(21) Appl. No.: 18/964,214

(22) Filed: Nov. 29, 2024

(65) Prior Publication Data

US 2025/0096890 A1 Mar. 20, 2025

Related U.S. Application Data

(63) Continuation of application No. PCT/JP2022/027334, filed on Jul. 12, 2022.

(51) Int. Cl.

*H04B 10/079* (2013.01)
*H04B 10/2575* (2013.01)
*H04B 10/40* (2013.01)

(52) U.S. Cl.

CPC ... *H04B 10/0795* (2013.01); *H04B 10/25759* (2013.01); *H04B 10/40* (2013.01)

(58) Field of Classification Search

CPC .................................................. H04B 10/0795

(Continued)

(56) References Cited

U.S. PATENT DOCUMENTS

2004/0156637 A1 8/2004 Jung et al.
2014/0247906 A1 9/2014 Pang et al.

(Continued)

FOREIGN PATENT DOCUMENTS

JP 2000-332686 A 11/2000
JP 2004-242300 A 8/2004

(Continued)

OTHER PUBLICATIONS

Bidirectional IFoF Mobile Fronthaul With DSP-based Channel Multiplexer and Demultiplexer (Year: 2021).*

(Continued)

*Primary Examiner* — Kenneth N Vanderpuye
(74) *Attorney, Agent, or Firm* — Birch, Stewart, Kolasch & Birch, LLP

(57) ABSTRACT

An IFoF scheme optical transmission system according to the present disclosure includes a transmission-side digital signal processing device including a correction processing unit and a calibration signal generating unit, and a reception-side digital signal processing device including a digital separation processing unit and a weight correction value calculating unit, in which the calibration signal generating unit generates a calibration signal ($S_{cal}(t)$), the digital separation processing unit performs demultiplexer processing to separate the calibration signal ($S_{cal}(t)$) into a plurality of baseband signals ($S_{OUT\_1}(t)$, $S_{OUT\_2}(t)$, . . . , $S_{OUT\_n}(t)$), the weight correction value calculating unit calculates parameter coefficients ($a_1, a_2, \ldots, a_n$) on the basis of the baseband signals ($S_{OUT\_1}(t)$, $S_{OUT\_2}(t)$, . . . , $S_{OUT\_n}(t)$), and the correction processing unit corrects an amplitude of each of a plurality of input radio signal strings that is input using the parameter coefficient ($a_1, a_2, \ldots, a_n$).

2 Claims, 7 Drawing Sheets

(58) Field of Classification Search
USPC .......................................................... 398/204
See application file for complete search history.

(56) References Cited

U.S. PATENT DOCUMENTS

| | | | | |
|---|---|---|---|---|
| 2018/0048416 | A1 | 2/2018 | Ye et al. | |
| 2020/0036446 | A1 | 1/2020 | Ge et al. | |
| 2022/0021455 | A1* | 1/2022 | Kim et al. ......... | H04B 10/2575 |
| 2025/0096921 | A1* | 3/2025 | Nishoka et al. .... | H04J 14/0256 |

FOREIGN PATENT DOCUMENTS

| | | | |
|---|---|---|---|
| JP | 2019-041285 | A | 3/2019 |
| JP | 2020-5303 | A | 1/2020 |
| JP | 2020-17836 | A | 1/2020 |

OTHER PUBLICATIONS

A DSP-Assisted IF-over-Fiber System With Extreme Learning MAchine-Based Linearization (Year: 2025).*
International Search Report (PCT/ISA/210) issued in PCT/JP2022/027334, dated Oct. 11, 2022.
Notice of Reasons for Refusal issued in Japanese Patent Application No. 2022-572272, dated Feb. 21, 2023.

* cited by examiner

IFoF SCHEME OPTICAL TRANSMISSION SYSTEM

CROSS REFERENCE TO RELATED APPLICATION

This application is a Continuation of PCT International Application No. PCT/JP2022/027334, filed on Jul. 12, 2022, which is hereby expressly incorporated by reference into the present application.

TECHNICAL FIELD

The present disclosure technology relates to an IFoF scheme optical transmission system.

BACKGROUND ART

An optical transmission system is a transmission system in which light is used as a signal transmission means in place of electromagnetic waves used in televisions and radios. In the optical transmission system, an optical fiber is generally used as a medium that propagates light. Therefore, a scheme of the optical transmission system is distinguished from a method in which light is emitted toward the atmosphere to propagate through the air. As a light source in the optical transmission system, for example, a semiconductor laser or a light emitting diode is used. In the optical transmission system, a light intensity modulation scheme of transmitting a signal in accordance with on-off of laser light or a coherent optical communication scheme of modulating a frequency or a phase shift of laser light in accordance with the signal is adopted.

The optical transmission system is expected as a transmission system of a next-generation mobile network.

As a method for implementing a mobile fronthaul (MFH) of a centralized radio access network (C-RAN) considered to be promising in the next-generation mobile network, there are a digital radio-over-fiber (D-RoF) and an analog radio-over-fiber (A-RoF).

The A-RoF has an advantage that analog waveforms of radio signals are transmitted as they are, so that a signal quality in an MFH operation is maintained with much less optical transmission bandwidth required than that of the D-RoF. On the other hand, by using a high-performance digital signal processor (DSP), multiplexing and demultiplexing of intermediate frequencies (IFs) can be implemented by digital signal processing. The digital signal processing by the high-performance DSP makes highly efficient and flexible transmission by dense frequency arrangement possible. The digital signal processing by the high-performance DSP makes it possible to cluster a plurality of channels and multiplex and demultiplex a plurality of clusters.

By combining multiplexing and demultiplexing by the DSP with the A-RoF, it is possible to perform frequency multiplexing of a plurality of radio signals in an intermediate frequency band (IF band) and collectively transmit to an antenna by one optical fiber and one wavelength by analog optical modulation. This optical fiber radio technology is sometimes referred to as an intermediate frequency over-fiber (IFoF) scheme.

For example, Patent Literature 1 discloses an A-RoF solution in which a plurality of different IF signals is frequency-multiplexed and transmitted by the A-RoF in radio signal transmission between a base band unit (BBU) and a remote radio head (RRH) (refer to [0004] and [0005], and FIGS. 2A and 2B of Patent Literature 1). In Patent Literature 1, the A-RoF solution is referred to as "A-RoF solution with ADC/DAC and IF multiplexer/demultiplexer", and a schematic configuration thereof is illustrated in FIG. 2B of Patent Literature 1.

CITATION LIST

Patent Literature

Patent Literature 1: JP 2020-5303 A

SUMMARY OF INVENTION

Technical Problem

In the optical transmission system by the A-RoF solution, as the number of signal channels increases, a wider frequency band needs to be used. When the number of signal channels is increased by fully using the Nyquist bands of the ADC and the DAC, a variation in signal channel level may occur due to a frequency characteristic of a component forming a transmission system. For example, among elements forming the optical transmission system by the A-RoF solution, an optical modulation device, a photodiode, analog circuit elements in the ADC and DAC, an optical fiber and the like may affect frequency characteristics of an entire transmission system (refer to FIG. 1).

An object of the present disclosure technology is to provide an optical transmission system by an A-RoF solution that improves a variation in signal channel level caused due to a comprehensive frequency characteristic of a transmission system.

Solution to Problem

An IFoF scheme optical transmission system according to the present disclosure technology includes a transmission-side digital signal processor including a correction processor and a calibration signal generator, and a reception-side digital signal processor including a digital separation processor and a weight correction value calculator, in which the calibration signal generator generates a calibration signal, the digital separation processor performs demultiplexer processing to separate the calibration signal into a plurality of baseband signals, the weight correction value calculator calculates parameter coefficients by referring to the baseband signals, and the correction processor corrects an amplitude of each of a plurality of input radio signal strings that is input using the parameter coefficients. Also, the parameter coefficients are obtained by normalizing a representative value calculated for the baseband signals with a maximum value of the representative value and taking a reciprocal.

Advantageous Effects of Invention

Because an optical transmission system according to the present disclosure technology has the above-described configuration, a variation in signal channel level caused by a comprehensive frequency characteristic of a transmission system is improved.

DESCRIPTION OF EMBODIMENTS

FIG. 1 is a reference diagram illustrating that, in an optical transmission system by an A-RoF solution, a variation in power level of signal channels may occur due to a comprehensive frequency characteristic of a transmission system.

Figures 1A, 1B, 1C:
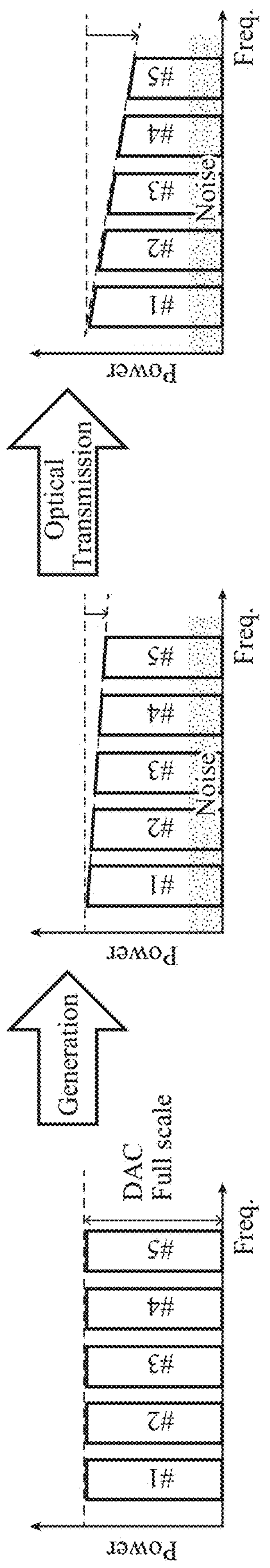
FIGS. 1A to 1C are reference diagrams for illustrating a problem to be solved by the present disclosure technology.

FIG. 1A in FIG. 1 illustrates, a data signal sampled by a digital-to-analog converter (DAC) on a BBU side (or a base station side) in a frequency domain when the number of signal channels is five. The horizontal axis in FIG. 1A represents a frequency, and the vertical axis in FIG. 1A represents power of the signal. In a graph of FIG. 1A, “#1”, “#2”, . . . , and “#5” represent signal channel numbers for identifying the signal channels. At a stage illustrated in FIG. 1A, it is illustrated that all the signal channels are at the same power level. Each signal channel in the graph of FIG. 1A has a constant width in a horizontal axis direction, that is, in a frequency direction. This is because each data is subjected to quadrature amplitude modulation (QAMV) on an individual intermediate frequency (IF) subband.

FIG. 1B in FIG. 1 illustrates an analog signal obtained by converting each data signal illustrated in FIG. 1A by the DAC. The horizontal axis and the vertical axis of the graph illustrated in FIG. 1B are the same as those illustrated in FIG. 1A. At a stage illustrated in FIG. 1B, a variation in power level of the signal channels occurs due to an influence of analog circuit elements and the like in the DAC. FIG. 1B also illustrates that noise occurs regardless of the frequency.

FIG. 1C in FIG. 1 illustrates a signal obtained by optically transmitting the analog signal generated by the DAC illustrated in FIG. 1B and sampling the same by an analog-to-digital converter (ADC) on an RRH side (or an antenna station side). The horizontal axis and the vertical axis of the graph illustrated in FIG. 1C are the same as those illustrated in FIG. 1A or 1B. At a stage illustrated in FIG. 1C, a variation larger than that at the stage in FIG. 1B occurs in the power level of the signal channels by the comprehensive frequency characteristic of the transmission system. FIG. 1C also illustrates that noise occurs regardless of the frequency. FIG. 1C illustrates that a signal channel having a low SNR, that is, poor quality may be generated due to the noise generated in the transmission system and the comprehensive frequency characteristic of the transmission system.

The optical transmission system according to the present disclosure technology improves the variation in signal channel level that occurs by the comprehensive frequency characteristic of the transmission system by a means described in the following embodiments. Means adopted by the optical transmission system according to the present disclosure technology will be more apparent in detail in the description with reference to the drawings of each of the following embodiments.

First Embodiment

Figure 2:
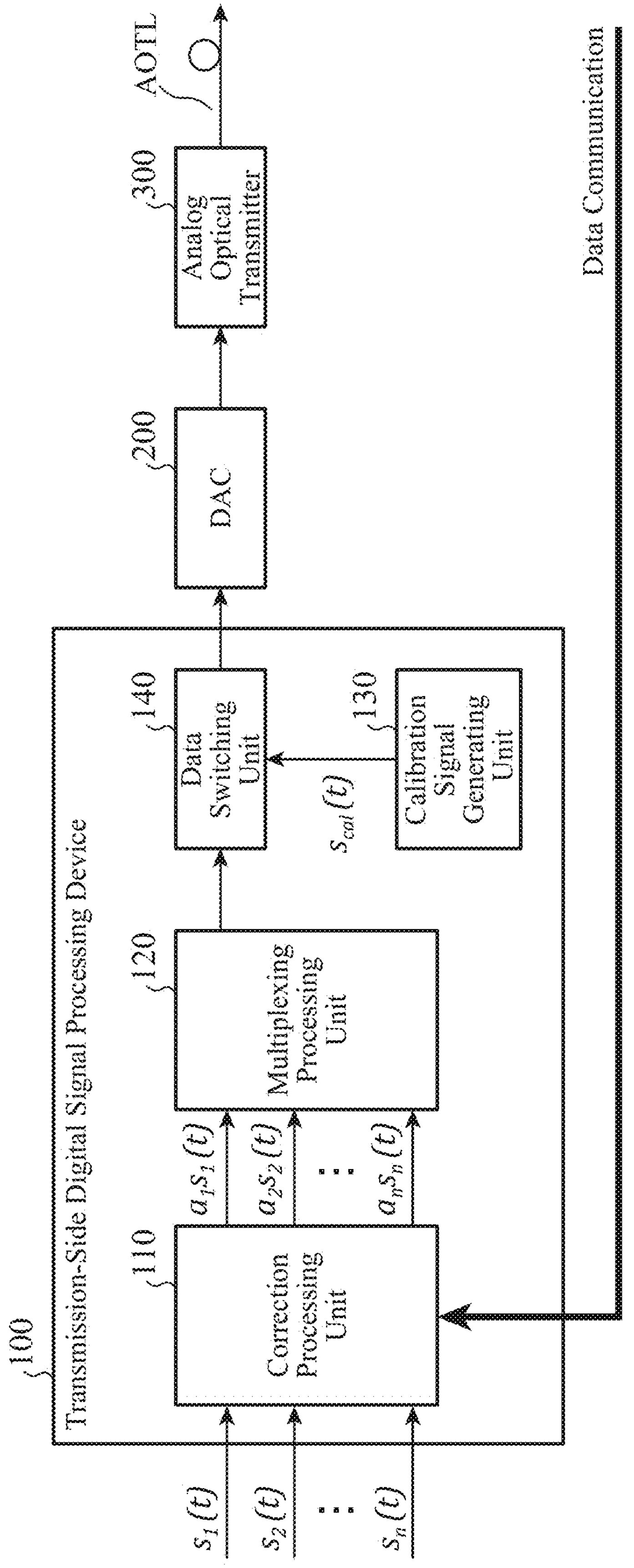
FIG. 2 is a block diagram illustrating a functional configuration on a transmission side of an optical transmission system according to a first embodiment.

FIG. 2 is a block diagram illustrating a functional configuration on an optical transmission side (hereinafter, simply referred to as a “transmission side”) of an optical transmission system according to a first embodiment. As illustrated in FIG. 2, the optical transmission system according to the first embodiment includes, on the transmission side, a transmission-side digital signal processing device 100, a DAC 200, and an analog optical transmitter 300. As illustrated in FIG. 2, the transmission-side digital signal processing device 100 includes a correction processing unit 110, a multiplexing processing unit 120, a calibration signal generating unit 130, and a data switching unit 140. The transmission side of the optical transmission system may be considered as, for example, an A-RoF optical subscriber line terminal device.

<<Correction Processing Unit 110 Forming Transmission-Side Digital Signal Processing Device 100>>

The correction processing unit 110 forming the transmission-side digital signal processing device 100 is a component that corrects amplitude of each input radio signal string arranged in each IF channel. Arrows $s_1(t)$, $s_2(t)$, . . . , $s_n(t)$ in FIG. 2 indicate signals obtained by arranging the input radio signal string in each IF channel or digital data streams for the signals. The number of digital data streams is represented by n. It can also be said that n is the number of signal channels.

Although signals handled by the transmission-side digital signal processing device 100 are digital signals, the input radio signal string is represented as $s_1(t)$, $s_2(t)$, . . . , and $s_n(t)$. The signal handled by the correction processing unit 110 is represented as if an analog signal as a function of time t. There is a reason for this description. This is because the transmission-side digital signal processing device 100 is implemented by a high-performance DSP, and this indicates that the transmission-side digital signal processing device 100 can handle an input signal as if this handles the analog signal.

The processing performed by the correction processing unit 110 can be expressed by a mathematical expression as follows.

$$\vec{y}(t) = W\vec{u}(t) = \overbrace{\begin{bmatrix} a_1 & 0 & \dots & 0 \\ 0 & a_2 & \dots & 0 \\ \vdots & \vdots & \ddots & \vdots \\ 0 & 0 & \dots & a_n \end{bmatrix}}^{W} \overbrace{\begin{bmatrix} s_1(t) \\ s_2(t) \\ \vdots \\ s_n(t) \end{bmatrix}}^{u(t)} = \overbrace{\begin{bmatrix} a_1 s_1(t) \\ a_2 s_2(t) \\ \vdots \\ a_n s_n(t) \end{bmatrix}}^{y(t)} \quad (1)$$

Here, u in bold represents the input radio signal string input to the correction processing unit 110, and specifically represents a vertical vector having $s_1(t)$, $s_2(t)$, . . . , and $s_n(t)$ as elements. Also, y in bold represents a corrected signal string output by the correction processing unit 110. W in bold represents a weight matrix. Because the processing of the correction processing unit 110 expressed by mathematical expression (1) is processing of changing a ratio between the input and the output as seen with the correction processing unit 110 as a reference, it can be said to be processing of changing a gain. Components $a_1$, $a_2$, . . . , and $a_n$ of the weight matrix (W) are calculated by a weight correction value calculating unit 620 to be described later. Because $a_1$, $a_2$, . . . , and $a_n$ are parameters and coefficients related to $s_1(t)$, $s_2(t)$, . . . , and $s_n(t)$, they are sometimes referred to as "parameter coefficients". Details regarding calculation of the weight matrix (W) or the parameter coefficient ($a_1$, $a_2$, . . . , $a_n$) will be apparent by the following description.

As illustrated in FIG. 1, in principle, the correction processing unit 110 functions to amplify the gain of the signal channel having a low power level to match the power levels. Therefore, each of $a_1$, $a_2$, . . . , and $a_n$, which are the parameter coefficients represented in mathematical expression (1), is a real number of 1 or larger in principle. Note that, when the gain of the signal channel is excessively amplified, the signal level exceeds an upper limit assumed by the transmission-side digital signal processing device 100, that is, an upper limit of the DAC 200 at a subsequent stage of the transmission-side digital signal processing device 100, and so-called saturation occurs in some cases.

The correction processing unit 110 forming the transmission-side digital signal processing device 100 preferably functions as a gain balancer that dynamically increases and decreases magnitude of the parameter coefficients ($a_1$, $a_2$, . . . , $a_n$) as a whole in such a manner that the signal level does not exceed the upper limit of the DAC 200. When decreasing the gain as a whole, each of the parameter coefficients ($a_1$, $a_2$, . . . , $a_n$) may be a real number smaller than 1.

The corrected signal string (y in bold) output by the correction processing unit 110 is transmitted to the multiplexing processing unit 120.

<<Multiplexing Processing Unit 120 Forming Transmission-Side Digital Signal Processing Device 100>>

The multiplexing processing unit 120 forming the transmission-side digital signal processing device 100 is a component for multiplexing the corrected signal string (y in bold) transmitted from the correction processing unit 110. Multiplexing is sometimes referred to as multiplexer processing, Multiplexing, or referred to as Muxing for short. A device that performs multiplexing (Muxing) in an intermediate frequency (IF) is sometimes represented as an IF-MUX. Processing performed by the IF-MUX is sometimes represented as IF-MUX processing. More specifically, the multiplexing processing unit 120 combines digital data streams related to the corrected signal string (y in bold) into one, and makes it possible to transmit the same to an optical reception side (hereinafter, simply referred to as a "reception side") via one shared analog optical transmission line (AOTL). The analog optical transmission line (AOTL) includes, for example, an optical fiber.

The signal multiplexed by the multiplexing processing unit 120 is transmitted to the data switching unit 140.

<<Calibration Signal Generating Unit 130 Forming Transmission-Side Digital Signal Processing Device 100>>

The calibration signal generating unit 130 forming the transmission-side digital signal processing device 100 is a component that generates a calibration signal ($S_{cal}(t)$) for determining the components $a_1$, $a_2$, . . . , and $a_n$ of the weight matrix (W). The calibration signal ($S_{cal}(t)$) is designed to have a flat frequency characteristic in a used frequency band as illustrated in FIG. 1A.

The calibration signal ($S_{cal}(t)$) generated by the calibration signal generating unit 130 is transmitted to the data switching unit 140.

<<Data Switching Unit 140 Forming Transmission-Side Digital Signal Processing Device 100>>

The data switching unit 140 forming the transmission-side digital signal processing device 100 is a component for switching data to be used depending on whether the optical transmission system is in an operation mode or a calibration mode. As illustrated in FIG. 2, the data switching unit 140 includes two input systems and one output system. One of the two input systems is from the multiplexing processing unit 120, and the other is from the calibration signal generating unit 130. When the optical transmission system is in the operation mode, the data switching unit 140 outputs the signal from the multiplexing processing unit 120 to the DAC 200. When the optical transmission system is in the calibration mode, the data switching unit 140 outputs the signal from the calibration signal generating unit 130 to the DAC 200.

Examples of a timing at which the optical transmission system performs calibration, that is, a timing at which the optical transmission system enters the calibration mode include a time of a trial run for the optical transmission system to start operating, a time of a periodic inspection, a time of a trial run performed after replacement of a consumable part, a time of a trial run after repair work and the like.

<<DAC 200>>

The DAC 200 is a component that converts a digital signal into an analog signal. The DAC in the name of the DAC 200 is an acronym of a digital-to-analog converter as described above. The signal converted into analog by the DAC 200 is transmitted to the analog optical transmitter 300.

<<Analog Optical Transmitter 300>>

The analog optical transmitter 300 is a component that converts an electrical analog signal transmitted from the DAC 200 into an optical signal and transmits the same to the analog optical transmission line (AOTL). That is, the analog optical transmitter 300 is an electrical-to-optical converter (EOC). The analog optical transmitter 300 is implemented by, for example, an electro-absorption modulator laser (EML). The EML is a semiconductor laser in which an electric field absorption type optical modulator for converting an electrical signal into an optical signal is integrated. In addition to the EML, the analog optical transmitter 300 may be implemented by a light intensity modulator in which a principle of a Mach-Zehnder interferometer is applied to a laser, or may be implemented by direct modulation of a laser.

The optical signal (hereinafter, referred to as an "IFoF signal") output from the analog optical transmitter 300 is transmitted to the reception side of the optical transmission system via the analog optical transmission line (AOTL).

Figure 3:
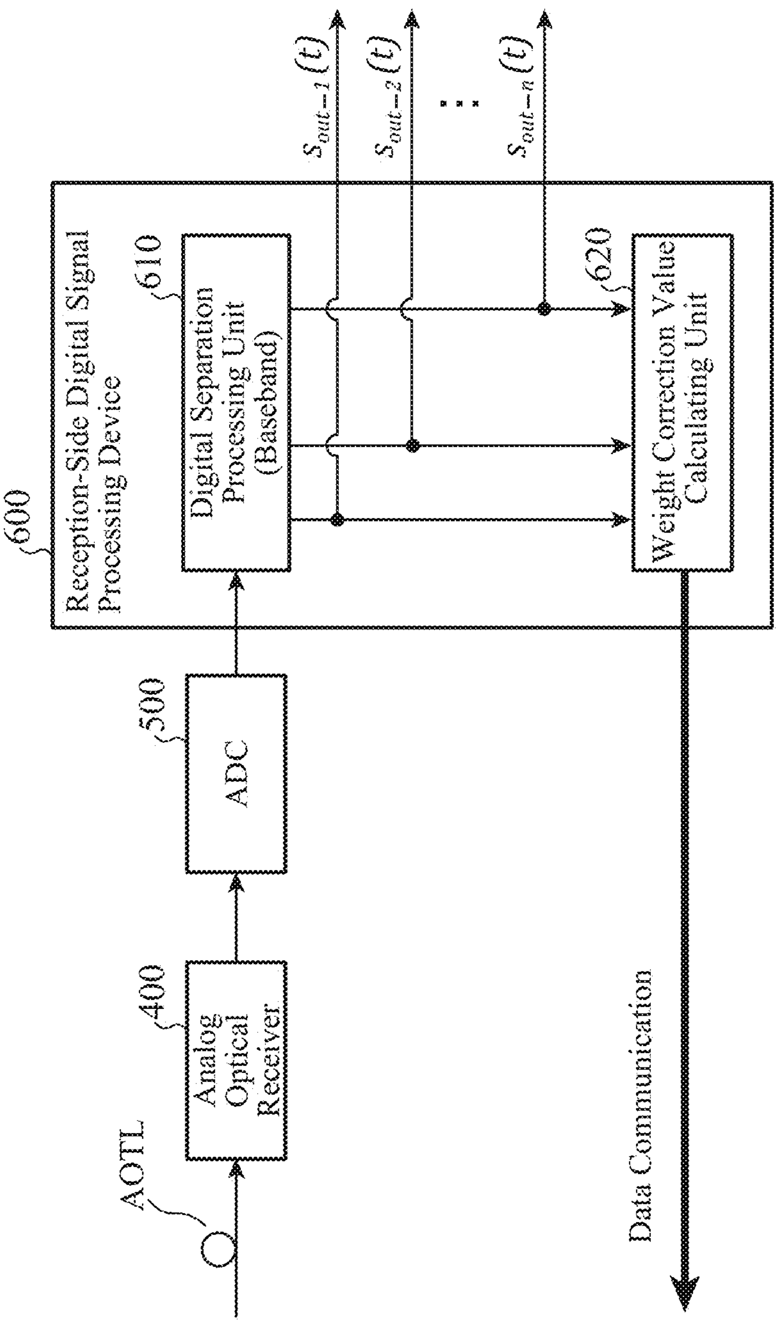
FIG. 3 is a block diagram illustrating a functional configuration on a reception side of the optical transmission system according to the first embodiment.

FIG. 3 is a block diagram illustrating a functional configuration on the reception side of the optical transmission system according to the first embodiment. As illustrated in FIG. 3, the optical transmission system according to the first embodiment includes, on the reception side, an analog optical receiver 400, an ADC 500, and a reception-side digital signal processing device 600. As illustrated in FIG. 3, the reception-side digital signal processing device 600 includes a digital separation processing unit 610, and the weight correction value calculating unit 620. The reception side of the optical transmission system may be considered as, for example, an A-RoF optical line terminal device.

<<Analog Optical Receiver 400>>

The analog optical receiver 400 is a component that converts the IFoF signal transmitted from the analog optical transmission line (AOTL) into an analog electrical signal. That is, the analog optical receiver 400 is an optical-to-electrical converter (OEC). The analog optical receiver 400 is implemented by, for example, a photo diode.

The analog optical receiver 400 corresponds to the analog optical transmitter 300 on the transmission side. The analog optical receiver 400 on the reception side acts reversely from the analog optical transmitter 300 on the transmission side.

The analog electrical signal output from the analog optical receiver 400 is transmitted to the ADC 500.

<<ADC 500>>

The ADC 500 is a component that converts an analog signal into a digital signal. As described above, the ADC of the ADC 500 is an acronym of analog-to-digital converter. The signal converted into the digital signal by the ADC 500 is transmitted to the reception-side digital signal processing device 600.

<<Reception-Side Digital Signal Processing Device 600>>

The reception-side digital signal processing device 600 is a component that implements IF channel separation on the reception side by an approach of digital signal processing in an IFoF scheme optical transmission system. Details of the IF channel separation will be apparent in the description regarding the digital separation processing unit 610 to be described later. Note that, in general, as a method of implementing the IF channel separation, an approach by an analog circuit is also conceivable in addition to an approach of digital signal processing. Advantages of the digital signal processing include a small-scale circuit, excellent flexibility, and excellent separation capability as compared with those by the analog circuit.

<<Digital Separation Processing Unit 610 Forming Reception-Side Digital Signal Processing Device 600>>

The digital separation processing unit 610 forming the reception-side digital signal processing device 600 is a component that separates the signal obtained by multiplexing (Muxing) in the intermediate frequency (IF) into the signal channels again. The processing performed by the digital separation processing unit 610 is sometimes referred to as demultiplexer processing, Demultiplexing, or referred to as Demuxing for short. In particular, the demultiplexer for the intermediate frequency (IF) is sometimes represented as IF-DeMUX. The processing performed by the IF-DeMUX is sometimes represented as IF-DeMUX processing.

The signal transmitted from the ADC 500 is separated into signal channels by demultiplexer processing by the digital separation processing unit 610. "(Baseband)" in FIG. 3 indicates processing contents of the digital separation processing unit 610 for separating into baseband signals.

Figure 4:
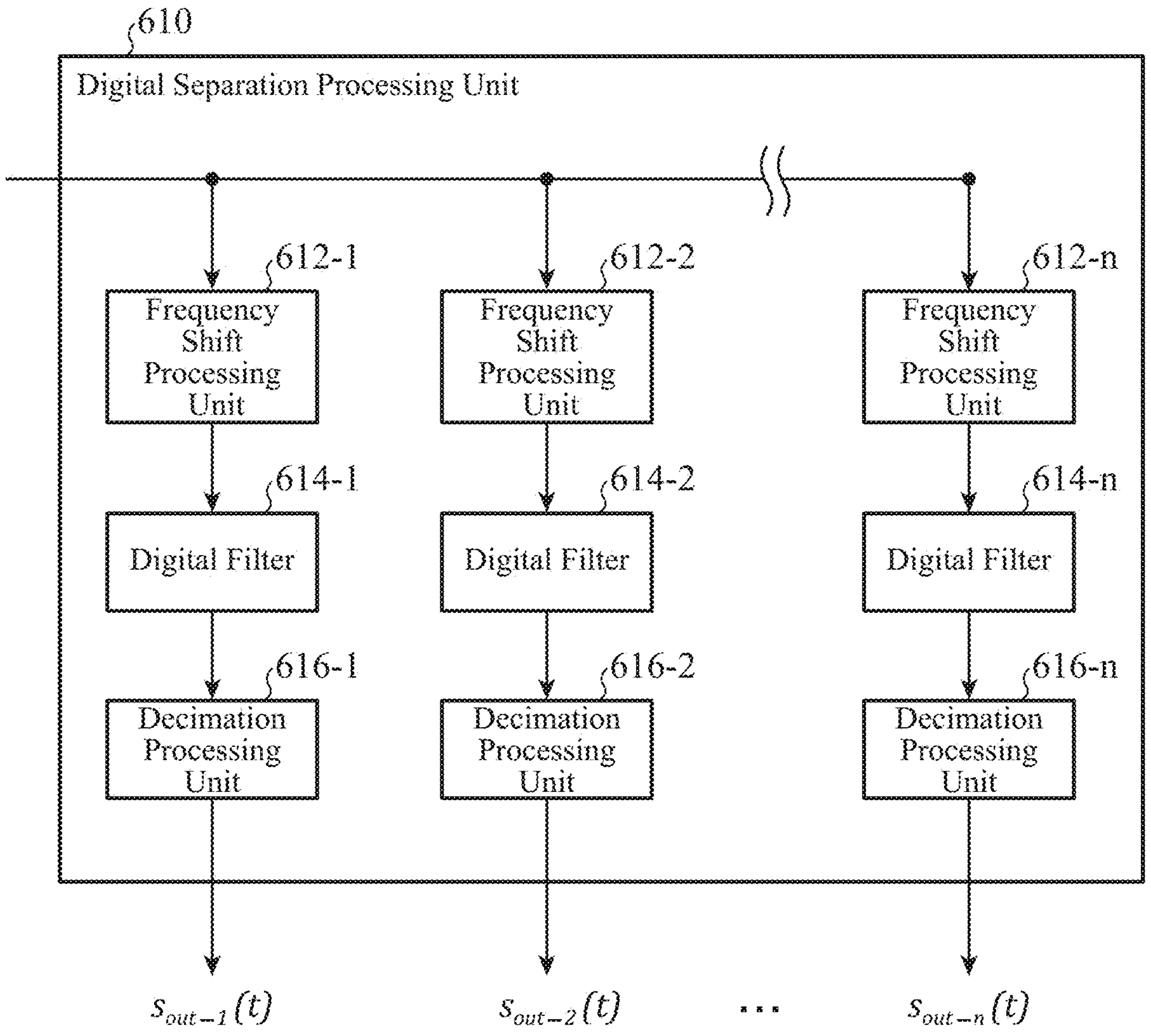
FIG. 4 is a block diagram illustrating a functional configuration (example) of a digital separation processing unit 610 forming the optical transmission system according to the first embodiment.

FIG. 4 is a block diagram illustrating a functional configuration (example) of the digital separation processing unit 610 forming the optical transmission system according to the first embodiment. As illustrated in FIG. 4, the digital separation processing unit 610 is a component of one input and n outputs including n systems. Each of the n systems in the digital separation processing unit 610 includes a frequency shift processing unit 612, a digital filter 614, and a decimation processing unit 616. As illustrated in FIG. 4, functional blocks in a first system are represented as a frequency shift processing unit 612-1, a decimation processing unit 616-1, and a decimation processing unit 616-1. In this manner, the functional block with "–1" after the reference sign represents the functional block in the first system. Similarly, the functional block with "–2" after the reference sign represents the functional block in a second system. In this specification, i is a variable that takes a natural number from 1 to n, and by adding "—i" after the reference sign, the functional block is represented as that of a general i-th system.

<<Frequency Shift Processing Unit 612-*i* in Digital Separation Processing Unit 610>>

A frequency shift processing unit 612-*i* of the i-th system in the digital separation processing unit 610 processes an i-th signal channel. Specifically, the frequency shift processing unit 612-*i* frequency-shifts a frequency of a band related to the i-th signal channel to, for example, 0 [Hz] or another frequency easy to be handled.

<<Digital Filter 614-*i* in Digital Separation Processing Unit 610>>

A digital filter 614-*i* of the i-th system in the digital separation processing unit 610 performs filter processing of extracting only the band related to the i-th signal channel.

<<Decimation Processing Unit 616-*i* in Digital Separation Processing Unit 610>>

A decimation processing unit 616-*i* of the i-th system in the digital separation processing unit 610 performs decimation processing on the extracted band related to the i-th signal channel. Decimation is processing of digitally sampling and thinning the output subjected to the filter processing.

The functional configuration of the digital separation processing unit 610 illustrated in FIG. 4 is an example, and may be other means as long as the IF-DeMUX processing, that is, the channel separation processing can be implemented.

As illustrated in FIG. 4, signals obtained by the IF-DeMUX processing are referred to as baseband signals, and are represented as $S_{OUT\_1}(t)$, $S_{OUT\_2}(t)$, . . . , and $S_{OUT\_n}(t)$.

Note that, in FIG. 4, a configuration in which n baseband signals $S_{OUT\_1}(t)$, $S_{OUT\_2}(t)$, . . . , and $S_{OUT\_n}(t)$ are output by parallel processing is illustrated, but the present disclosure technology is not limited thereto. The digital separation processing unit 610 may perform the signal processing not in parallel (parallel) but in series (series), that is, in multiple stages. The digital separation processing unit 610 may adopt a tournament structure and narrow down bands and rates in multiple stages.

Depending on whether the optical transmission system is in the operation mode or the calibration mode, a destination to which the output signal of the digital separation processing unit 610 is transmitted and the use of the output signal are different.

When the optical transmission system is in the operation mode, that is, when the data switching unit 140 on the transmission side selects the signal from the multiplexing processing unit 120, the output signal of the digital separation processing unit 610 is output to the outside.

When the optical transmission system is in the calibration mode, that is, when the data switching unit 140 on the transmission side selects the calibration signal ($S_{cal}(t)$) from the calibration signal generating unit 130, the output signal of the digital separation processing unit 610 is transmitted to the weight correction value calculating unit 620.

<<Weight Correction Value Calculating Unit 620 Forming Reception-Side Digital Signal Processing Device 600>>

The weight correction value calculating unit 620 forming the reception-side digital signal processing device 600 is a component that determines the weight matrix (W) used by the correction processing unit 110 on the transmission side. The weight correction value calculating unit 620 is a component operated only when the optical transmission system is in the calibration mode, that is, only when the data switching unit 140 on the transmission side selects the calibration signal ($S_{cal}(t)$) from the calibration signal generating unit 130.

First processing performed by the weight correction value calculating unit 620 is to perform Fourier transform on the baseband signal ($S_{OUT\_1}(t)$, $S_{OUT\_2}(t)$, . . . , and $S_{OUT\_n}(t)$) of each signal channel.

Figure 5:
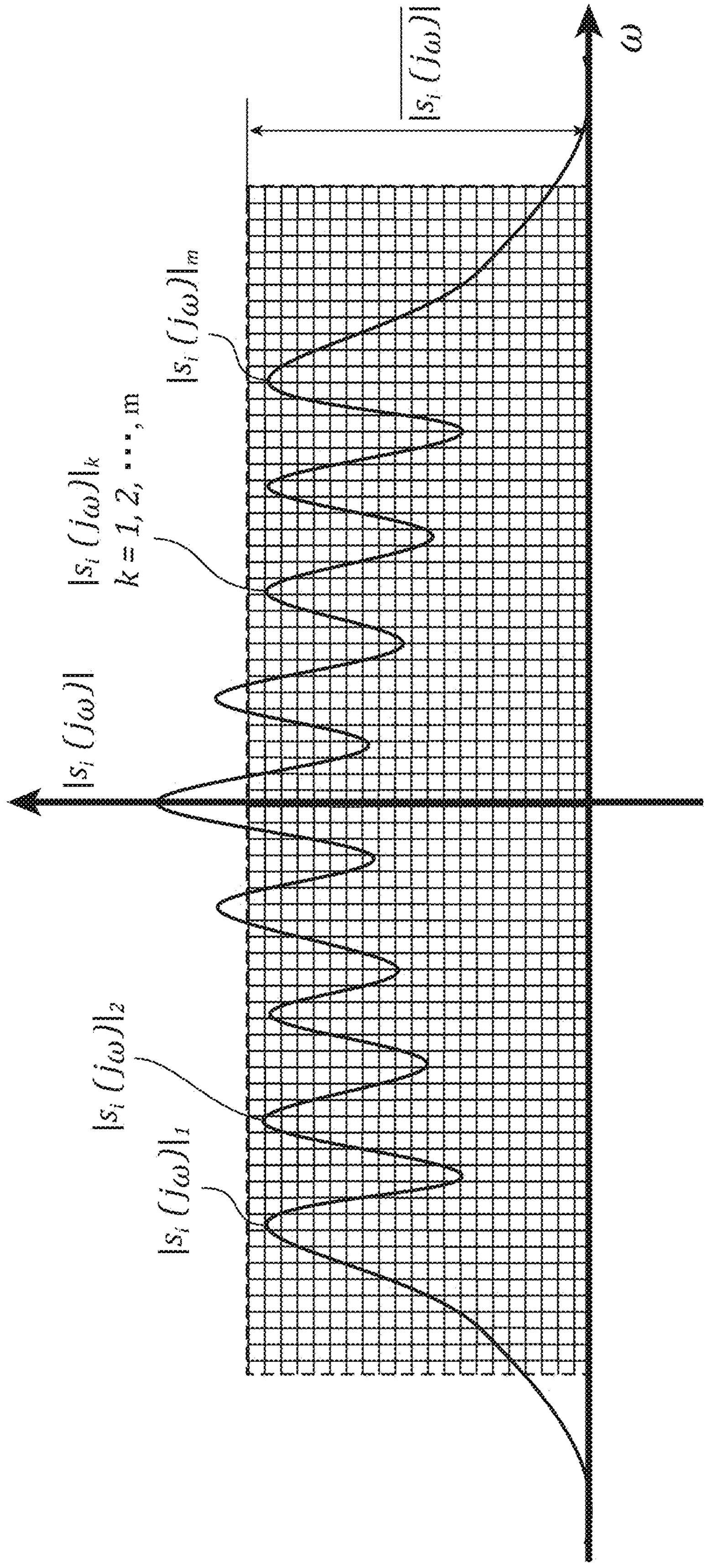
FIG. 5 is a graph obtained by performing Fourier transform on a baseband signal.

FIG. 5 is a graph obtained by performing Fourier transform on the baseband signal. In the graph illustrated in FIG. 5, the horizontal axis represents an angular frequency (ω), and the vertical axis represents magnitude (distance from origin on complex plane, $|S_i(jw)|$) of a spectrum (complex number, $S_i(jw)$) obtained by the Fourier transform. In the graph illustrated in FIG. 5, k=1, 2, . . . , m may be, for example, a bin of the angular frequency (ω) or an identification number given to a spectral peak.

A hatched rectangle in the graph illustrated in FIG. 5 corresponds to one of five rectangles #1 to #5 (i=1, 2, . . . , 5) illustrated in FIG. 1. Although FIG. 5 illustrates a Fourier transform result for the i-th baseband signal, the weight correction value calculating unit 620 performs the Fourier transform for all the baseband signals (i=1, 2, . . . , n). Note that, in the Fourier transform performed by the weight correction value calculating unit 620, the number of points of the Fourier transform (number of sampling points or number of FFT points) may be appropriately determined based on specifications of the optical transmission system.

Second processing performed by the weight correction value calculating unit 620 is to calculate a representative value representing the power level for the baseband signal ($S_{OUT\_1}(t)$, $S_{OUT\_2}(t)$, . . . , and $S_{OUT\_n}(t)$) of each signal channel.

The representative value representing the power level may be, for example, an average value given by the following mathematical expression.

$$\overline{|S_i(J\omega)|} = \frac{1}{m}\sum_{k=1}^{m} |S_i(j\omega)|_k \tag{2}$$

The representative value representing the power level for the baseband signal ($S_{OUT\_1}(t)$, $S_{OUT\_2}(t)$, . . . , and $S_{OUT\_n}(t)$) of each signal channel may be a most frequent value and a median value in addition to an average value. Mathematical expression (2) gives the representative value representing the power level by an arithmetic mean, but other average values such as a geometric mean and a harmonic mean may be adopted.

Third processing performed by the weight correction value calculating unit 620 is to determine the weight matrix (W) used by the correction processing unit 110 on the transmission side by referring to the representative value calculated for the baseband signal ($S_{OUT\_1}(t)$, $S_{OUT\_2}(t)$, . . . , and $S_{OUT\_n}(t)$) of each signal channel.

Specifically, the weight matrix (W) may be a diagonal matrix as expressed by mathematical expression (1). The diagonal components and parameter coefficients $a_1$, $a_2$, . . . , and $a_n$ of the weight matrix (W) may be calculated as follows, for example, $$\text{for } i = 1 \text{ to } n \;\; a_i := \frac{M}{\overline{|S_i(jw)|}} \text{ wherein } M := \max\left(\overline{|S_1(jw)|}, \overline{|S_2(jw)|}, \ldots, \overline{|S_n(jw)|}\right) \tag{3}$$

As expressed by mathematical expression (3), it can be said that the diagonal components and parameter coefficients $a_1$, $a_2$, . . . , and $a_n$ of the weight matrix (W) are obtained by normalizing the representative value calculated for the baseband signal ($S_{OUT\_1}(t)$, $S_{OUT\_2}(t)$, . . . , and $S_{OUT\_n}(t)$) of each signal channel with a maximum value (M) of the representative value and taking the reciprocal thereof. Normalization with the maximum value (M) of the representative value is intended to prevent occurrence of the saturation described above.

The weight matrix (W) or the parameter coefficient ($a_1$, $a_2$, . . . , and $a_n$) calculated by the weight correction value calculating unit 620 is transmitted to the correction processing unit 110 on the transmission side. Note that, FIGS. 2 and 3 illustrate that the output of the weight correction value calculating unit 620 is transmitted to the correction processing unit 110 via "data communication", but the present disclosure technology is not limited thereto. The weight matrix (W) or the parameter coefficient ($a_1$, $a_2$, . . . , and $a_n$) calculated by the weight correction value calculating unit 620 may be carried by a person, for example, by a user of the optical transmission system so as to be used by the correction processing unit 110 on the transmission side.

The optical transmission system according to the present disclosure technology has a technical feature that a variation in signal channel level is monitored in a frequency domain by the first processing to third processing performed by the weight correction value calculating unit 620. Comparing the signal channel levels in frequency domain means comparing an energy amount per signal channel. A content of the first processing to third processing performed by the weight correction value calculating unit 620 is referred to as "FFT monitoring" in the present specification.

As described above, because the optical transmission system according to the first embodiment has the above-described configuration, the variation in signal channel level caused by a comprehensive frequency characteristic of the transmission system is improved.

Second Embodiment

An optical transmission system according to a second embodiment is a variation of the optical transmission system according to the present disclosure technology. Specifically, the optical transmission system according to the second embodiment indicates that the present disclosure technology can also be implemented by software.

Unless otherwise specified, the same reference numerals as those used in the first embodiment are used in the second embodiment. In the second embodiment, the description overlapping with that of the first embodiment is appropriately omitted.

Figure 6A:
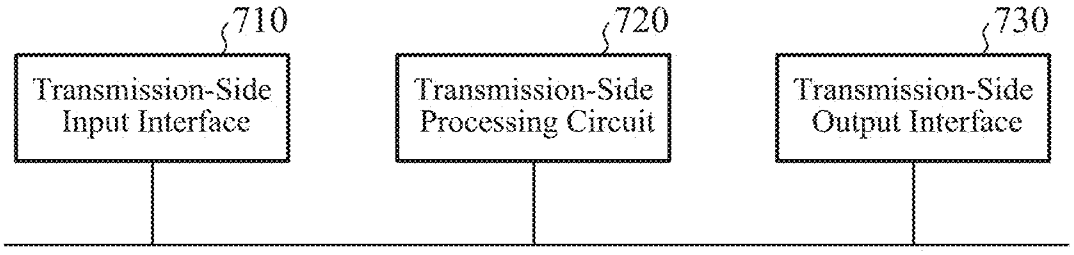
FIGS. 6A and 6B are hardware configuration diagrams of a transmission-side digital signal processing device 100 according to a second embodiment.
Figure 6B:
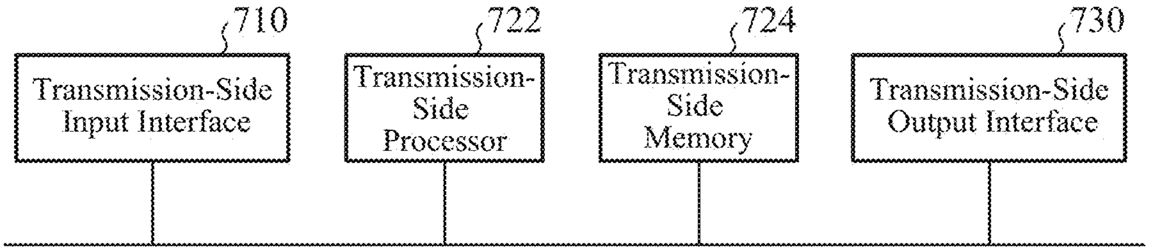

FIG. 6 is a hardware configuration diagram of a transmission-side digital signal processing device 100 according to the second embodiment. FIG. 6A in an upper part of FIG. 6 illustrates a case where a function of the optical transmission system (transmission side) according to the present disclosure technology is implemented by hardware. FIG. 6B in a lower part of FIG. 6 illustrates a case where a function of the optical transmission system (transmission side) according to the present disclosure technology is implemented by software.

In the configuration illustrated in FIG. 6A, the transmission-side digital signal processing device 100 includes a transmission-side input interface 710, a transmission-side processing circuit 720, and a transmission-side output interface 730.

In the configuration illustrated in FIG. 6B, the transmission-side digital signal processing device 100 includes the transmission-side input interface 710, a transmission-side processor 722, a transmission-side memory 724, and the transmission-side output interface 730.

Functions of a correction processing unit 110, a multiplexing processing unit 120, a calibration signal generating unit 130, and a data switching unit 140 in the transmission-side digital signal processing device 100 are implemented by a processing circuit. The processing circuit may be either dedicated hardware (refer to FIG. 6A) or a central processing unit (CPU; also referred to as a central processing device, a processing device, an arithmetic device, a microprocessor, a microcomputer, a processor, or a DSP) that executes a program stored in a memory (refer to FIG. 6B).

As illustrated in FIG. 6A, in a case where the processing circuit is the dedicated hardware, that is, implemented by the transmission-side processing circuit 720, the transmission-side processing circuit 720 may be a single circuit, a composite circuit, a programmed processor, a parallel-programmed processor, ASIC, FPGA, or a combination thereof. The functions of the correction processing unit 110, the multiplexing processing unit 120, the calibration signal generating unit 130, and the data switching unit 140 may be implemented by a plurality of independent transmission-side processing circuits 720, or collectively implemented by one transmission-side processing circuit 720.

As illustrated in FIG. 6B, in a case where the processing circuit is the CPU, the functions of the correction processing unit 110, the multiplexing processing unit 120, the calibration signal generating unit 130, and the data switching unit 140 may be implemented by software, firmware, or a combination of software and firmware. The software and firmware are described as a program and stored in the transmission-side memory 724. The processing circuit implements the functions of the units by reading and executing the program stored in the transmission-side memory 724. That is, the transmission-side digital signal processing device 100 includes the transmission-side memory 724 for storing a program that, when executed by the processing circuit, results in execution of processing contents executed by the correction processing unit 110, the multiplexing processing unit 120, the calibration signal generating unit 130, and the data switching unit 140 described in the first embodiment. It can also be said that these programs allow a computer to execute the procedures and methods performed in the correction processing unit 110, the multiplexing processing unit 120, the calibration signal generating unit 130, and the data switching unit 140. Here, the transmission-side memory 724 may be, for example, a nonvolatile or volatile semiconductor memory such as RAM, ROM, a flash memory, EPROM, or EEPROM. The transmission-side memory 724 may include a disk such as a magnetic disk, a flexible disk, an optical disk, a compact disk, a mini disk, or a DVD. Moreover, the transmission-side memory 724 may be an HDD or an SSD.

The transmission-side memory 724 may store information necessary for the calibration signal generating unit 130 to generate a calibration signal ($S_{cal}(t)$).

The transmission-side output interface 730 may include a function of a DAC 200 or functions of the DAC 200 and an analog optical transmitter 300.

Note that, some of the functions of the correction processing unit 110, the multiplexing processing unit 120, the calibration signal generating unit 130, and the data switching unit 140 may be implemented by dedicated hardware, and some of other functions may be implemented by software or firmware. In this manner, the processing circuit can implement the functions of the correction processing unit 110, the multiplexing processing unit 120, the calibration signal generating unit 130, and the data switching unit 140 by hardware, software, firmware, or a combination thereof.

Figure 7A:
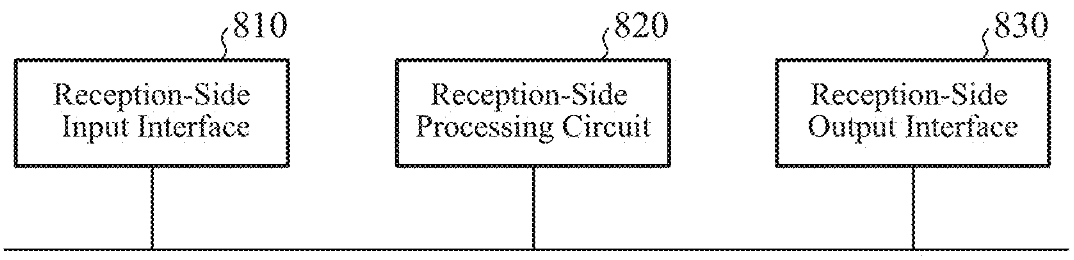
FIGS. 7A and 7B are hardware configuration diagrams of a reception-side digital signal processing device 600 according to the second embodiment.
Figure 7B:
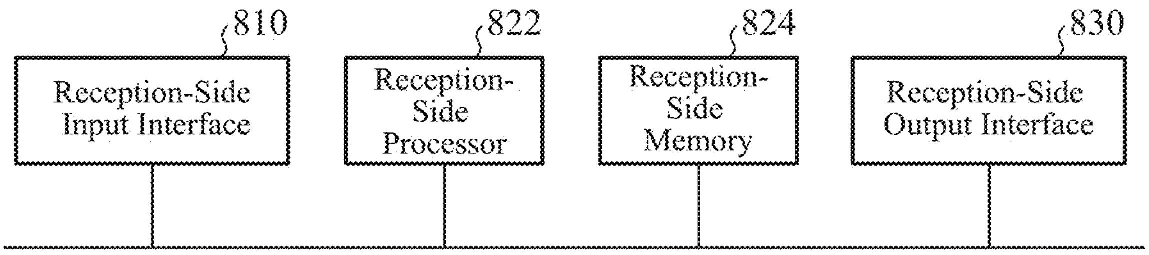

FIG. 7 is a hardware configuration diagram of a reception-side digital signal processing device 600 according to the second embodiment. FIG. 7A in an upper part of FIG. 7 illustrates a case where a function of the optical transmission system (reception side) according to the present disclosure technology is implemented by hardware. FIG. 7B in a lower part of FIG. 7 illustrates a case where a function of the optical transmission system (reception side) according to the present disclosure technology is implemented by software.

In the configuration illustrated in FIG. 7A, the reception-side digital signal processing device 600 includes a reception-side input interface 810, a reception-side processing circuit 820, and a reception-side output interface 830.

In the configuration illustrated in FIG. 7B, the reception-side digital signal processing device 600 includes the reception-side input interface 810, a reception-side processor 822, a reception-side memory 824, and the reception-side output interface 830.

Functions of a digital separation processing unit 610 and a weight correction value calculating unit 620 in the reception-side digital signal processing device 600 are implemented by a processing circuit. The processing circuit may be either dedicated hardware (refer to FIG. 7A) or a CPU that executes a program stored in a memory (refer to FIG. 7B).

As illustrated in FIG. 7A, in a case where the processing circuit is the dedicated hardware, that is, implemented by the reception-side processing circuit 820, the reception-side processing circuit 820 may be a single circuit, a composite circuit, a programmed processor, a parallel-programmed processor, ASIC, FPGA, or a combination thereof. The functions of the digital separation processing unit 610 and the weight correction value calculating unit 620 may be implemented by a plurality of independent reception-side processing circuits 820, or collectively implemented by one reception-side processing circuit 820.

As illustrated in FIG. 7B, in a case where the processing circuit is the CPU, the functions of the digital separation processing unit 610 and the weight correction value calculating unit 620 may be implemented by software, firmware, or a combination of software and firmware. The software and firmware are described as a program and stored in the reception-side memory 824. The processing circuit implements the functions of the units by reading and executing the program stored in the reception-side memory 824. That is, the reception-side digital signal processing device 600 includes the reception-side memory 824 for storing a program that, when executed by the processing circuit, results in execution of processing contents executed by the digital separation processing unit 610 and the weight correction value calculating unit 620 described in the first embodiment. It can also be said that these programs allow a computer to execute the procedures and methods performed in the digital separation processing unit 610 and the weight correction value calculating unit 620. Here, the reception-side memory 824 may be, for example, a nonvolatile or volatile semiconductor memory such as RAM, ROM, a flash memory, EPROM, or EEPROM. The reception-side memory 824 may include a disk such as a magnetic disk, a flexible disk, an optical disk, a compact disk, a mini disk, or a DVD. Moreover, the reception-side memory 824 may be an HDD or an SSD.

The reception-side memory 824 may store a weight matrix (W) calculated by the weight correction value calculating unit 620 as a history together with information such as calculated date and time.

The reception-side input interface 810 may include a function of an ADC 500 or functions of the ADC 500 and an analog optical receiver 400.

Note that, some of the functions of the digital separation processing unit 610 and the weight correction value calculating unit 620 may be implemented by dedicated hardware, and some of other functions may be implemented by software or firmware. In this manner, the processing circuit can implement the functions of the digital separation processing unit 610 and the weight correction value calculating unit 620 by hardware, software, firmware, or a combination thereof.

As described above, because the optical transmission system according to the second embodiment has the above-described configuration, this may be implemented by hardware, software, firmware or a combination thereof, and there is an effect that a variation in signal channel level caused by a comprehensive frequency characteristic of the transmission system is improved.

Third Embodiment

An optical transmission system according to a third embodiment is a variation of the optical transmission system according to the present disclosure technology.

Unless otherwise specified, the same reference numerals as those used in the already described embodiments are used in the third embodiment. In the third embodiment, the description overlapping with that of the already described embodiment is appropriately omitted.

As described above, the present disclosure technology has a problem to be solved of a variation in signal channel level that may occur when the number of signal channels is increased by fully using the Nyquist bands of the ADC and DAC. In order to solve this problem, for example, a method of decreasing the number of signal channels by compressing information on a transmission side and restoring the information on a reception side is also conceivable. However, the present disclosure technology solves the problem by pre-emphasis without changing the premise that the signal channels are increased by fully using the Nyquist bands of the ADC and DAC.

The variation in signal channel level that may occur when the signal channels are increased by fully using the Nyquist bands of the ADC and DAC especially appears as attenuation on a high frequency side.

In the first embodiment, it is described that FFT monitoring is performed for all the signal channels, but the present disclosure technology is not limited thereto. The optical transmission system according to the present disclosure technology may be configured to perform the FFT monitoring of only a specific signal channel, for example, only several signal channels on the high frequency side.

A correction processing unit 110 forming a transmission-side digital signal processing device 100 according to the third embodiment is only required to perform correction processing on only a specific signal channel, for example, only several signal channels on the high frequency side. In parameter coefficients ($a_1, a_2, \ldots, a_n$) used by the correction processing unit 110, a value of 1 is substituted for all the parameter coefficients corresponding to channels other than the specific signal channel.

A calibration signal generating unit 130 forming the transmission-side digital signal processing device 100 according to the third embodiment is only required to generate calibration signals for only a specific signal channel, for example, only several signal channels on the high frequency side.

A weight correction value calculating unit 620 forming a reception-side digital signal processing device 600 according to the third embodiment is only required to calculate a weight correction value only for a specific signal channel included in the calibration signal transmitted from the transmission side. As described above, in the parameter coefficients ($a_1, a_2, \ldots, a_n$), a value of 1 is substituted for all the parameter coefficients corresponding to channels other than the specific signal channel.

As described above, because the optical transmission system according to the third embodiment has the above-described configuration, pre-emphasis can be performed on a specific signal channel in which attenuation occurs, and the variation in signal channel level can be improved.

Fourth Embodiment

An optical transmission system according to a fourth embodiment is a variation of the optical transmission system according to the present disclosure technology.

Unless otherwise specified, the same reference numerals as those used in the already described embodiments are used in the fourth embodiment. In the fourth embodiment, the description overlapping with that of the already described embodiment is appropriately omitted.

As described in the third embodiment, a variation in signal channel level especially appears as attenuation on a high frequency side. This characteristic of high-frequency attenuation can be approximated by a simple mathematical model. Specifically, a polynomial equation can be considered as a mathematical model that approximates the characteristic of the high-frequency attenuation.

Although the present disclosure technology is not limited thereto, for the sake of simplicity, a case where the characteristic of the high-frequency attenuation is linearly approximated will be considered. A calibration signal generating unit 130 forming a transmission-side digital signal processing device 100 according to the fourth embodiment is only required to generate calibration signals for at least only two signal channels out of the signal channels with the high-frequency attenuation.

A weight correction value calculating unit 620 forming a reception-side digital signal processing device 600 according to the fourth embodiment first calculates the weight correction value only for a specific signal channel included in the calibration signal transmitted from the transmission side, that is, at least two signal channels. Secondly, the weight correction value calculating unit 620 obtains the weight correction value for the remaining signal channel with the high-frequency attenuation by assuming that the characteristic of the high-frequency attenuation can be linearly approximated, that is, by interpolation or extrapolation.

As described above, because the optical transmission system according to the fourth embodiment has the above-described configuration, the characteristic of the high-frequency attenuation can be modeled mathematically, pre-emphasis can be performed on a specific signal channel in which attenuation occurs, and the variation in signal channel level can be improved.

INDUSTRIAL APPLICABILITY

The present disclosure technology can be applied to, for example, a mobile fronthaul (MFH) of a centralized radio access network (C-RAN) considered to be promising in a next-generation mobile network, and has industrial applicability.

100: transmission-side digital signal processing device (transmission-side digital signal processor), 110: correction processing unit (correction processor), 120: multiplexing processing unit, 130: calibration signal generating unit (calibration signal generator), 140: data switching unit, 200: DAC, 300: analog optical transmitter, 400: analog optical receiver, 500: ADC, 600: reception-side digital signal processing device (reception-side digital signal processor), 610: digital separation processing unit (digital separation processor), 620: weight correction value calculating unit (weight correction value calculator), 710: transmission-side input interface, 720: transmission-side processing circuit, 722: transmission-side processor, 724: transmission-side memory, 730: transmission-side output interface, 810: reception-side input interface, 820: reception-side processing circuit, 822: reception-side processor, 824: reception-side memory, 830: reception-side output interface

What is claimed is:

1. An IFoF scheme optical transmission system comprising:

a transmission-side digital signal processor including a correction processor and a calibration signal generator; and a reception-side digital signal processor including a digital separation processor and a weight correction value calculator, wherein, the calibration signal generator generates a calibration signal, the digital separation processor performs demultiplexer processing to separate the calibration signal into a plurality of baseband signals, the weight correction value calculator calculates parameter coefficients by referring to the baseband signals, and the correction processor corrects an amplitude of each of a plurality of input radio signal strings that is input using the parameter coefficients, and wherein, the parameter coefficients are obtained by normalizing a representative value calculated for the baseband signals with a maximum value of the representative value and taking a reciprocal.

2. An IFoF scheme optical transmission system comprising:

a transmission-side digital signal processor including a correction processor and a calibration signal generator; and a reception-side digital signal processor including a digital separation processor and a weight correction value calculator, wherein, the calibration signal generator generates a calibration signal, the digital separation processor performs demultiplexer processing to separate the calibration signal into a plurality of baseband signals, the weight correction value calculator calculates parameter coefficients by referring to the baseband signals, and the correction processor corrects an amplitude of each of a plurality of input radio signal strings that is input using the parameter coefficients, and wherein, the reception-side digital signal processor includes a mathematical model to approximate a characteristic of high-frequency attenuation, and the reception-side digital signal processor obtains a weight correction value for a signal channel with high-frequency attenuation on a basis of the mathematical model.

* * * * *